Aug. 29, 1967  H. G. SCHWEER  3,338,561
APPLICATORS FOR VISCOUS MATERIALS
Filed July 21, 1965  2 Sheets-Sheet 1
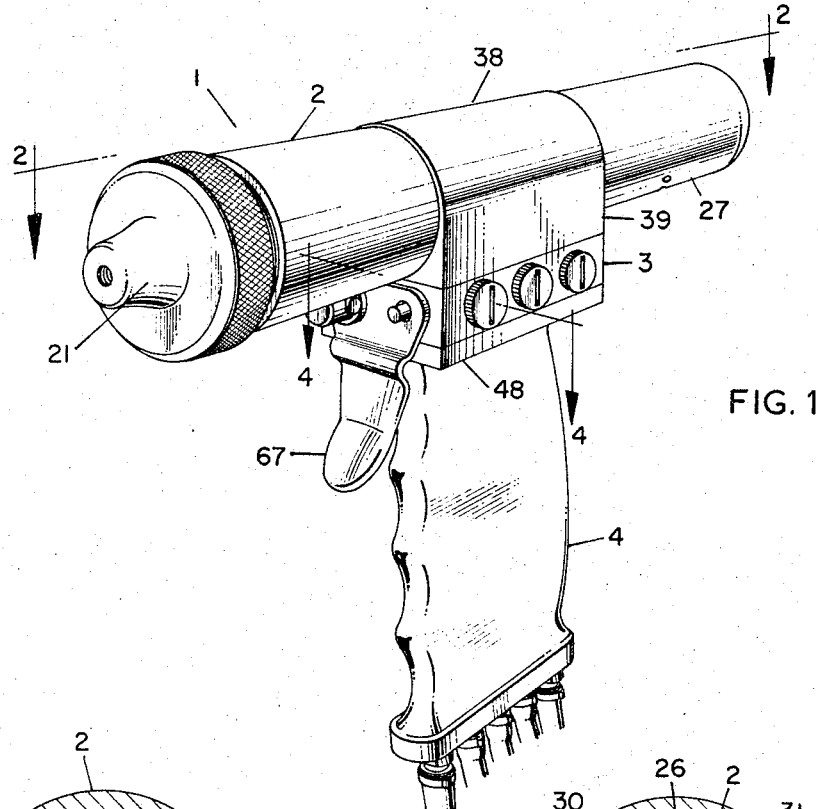
FIG. 1
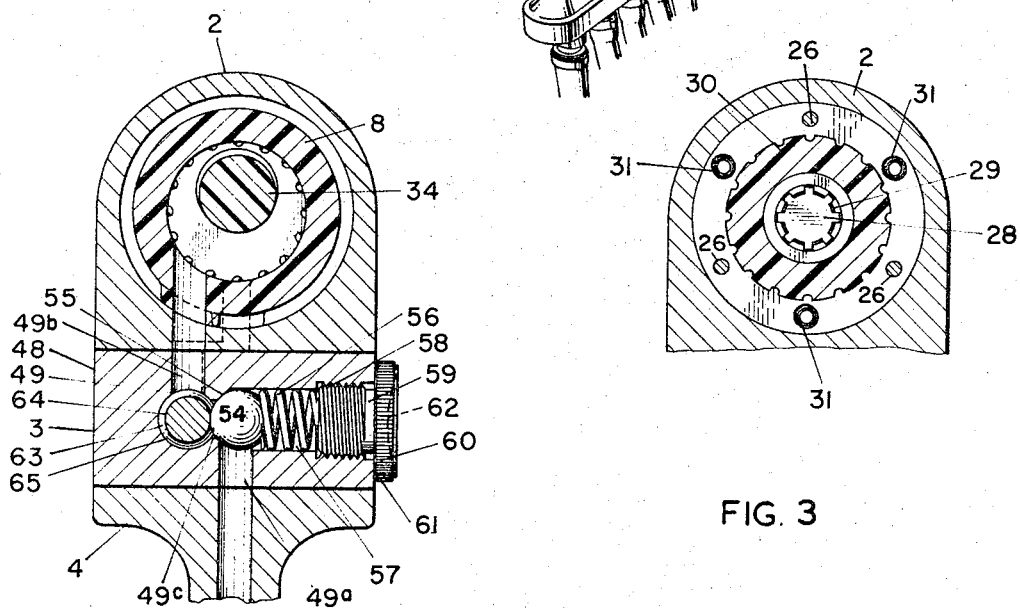
FIG. 3
FIG. 4
INVENTOR
HELMUT G. SCHWEER
BY Pinnie & Smiley
ATTORNEYS

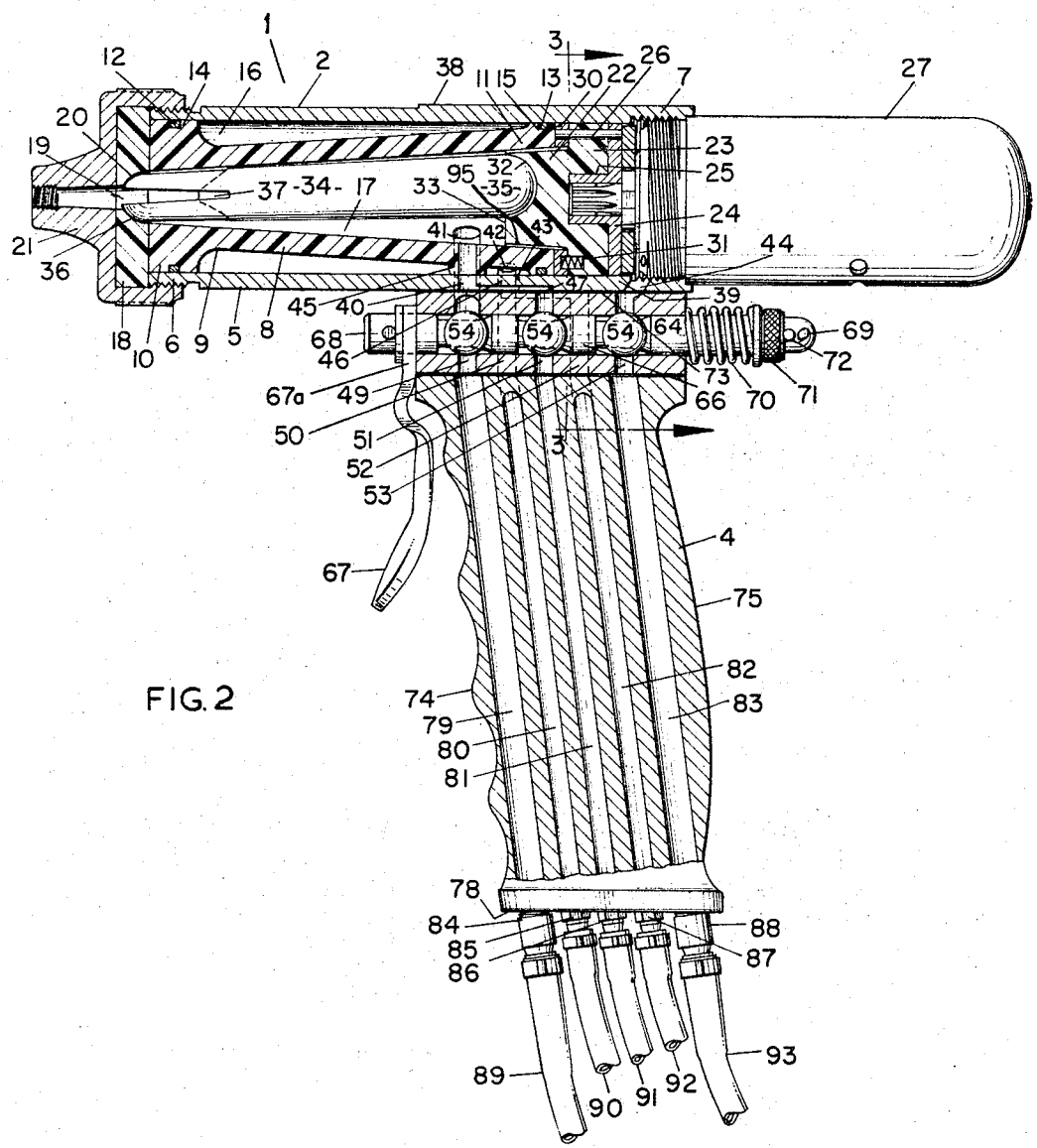

United States Patent Office 3,338,561
Patented Aug. 29, 1967

3,338,561
APPLICATORS FOR VISCOUS MATERIALS
Helmut G. Schweer, 583 Park Crescent, Fairport Beach, Ontario, Canada
Filed July 21, 1965, Ser. No. 473,587
7 Claims. (Cl. 259—5)

ABSTRACT OF THE DISCLOSURE

An applicator for viscous materials, having a mixing chamber of tapering interior in which materials having different characteristics and from different inlet sources and fed under the control of manually adjustable valve means, are mixed and discharged by means of an agitator member, tapered in substantial conformity with the interior of the mixing chamber and mounted therewithin and eccentrically driven by means of a driving block constituting an eccentric mounting for the largest end of said agitator member.

---

This invention relates to improvements in applicators for viscous materials wherein the ingredients of a compound are mixed immediately prior to the application thereof.

It is conventional practice to prepare material such as, for example, epoxy or polyester, used for automotive body filler, by mixing the resin and hardener in the desired quantities for any given job as and when required. The disadvantages of this system are that it is wasteful both in time and material, an operator being required to measure and mix in precise proportions each time and generally preparing too great a quantity to avoid the necessity for stopping to mix up a fresh batch of filler before the task is completed. Furthermore, the mixing operation, particularly in a large quantity, may result in a non-uniform spread of hardening agent so that parts of the mixture may require different hardening times and, when dry, possess different physical properties. Another disadvantage of the present method is that the application is by means of a putty knife or the like, which is a slow and cumbersome method, particularly when large and deep depressions require to be filled.

It is, therefore, a primary object of the instant invention to provide a mixer and applicator, to be hereinafter referred to as an applicator gun, which will maintain a continuous flow of material whenever selected by the operator and thereby supply only the required quantity for the job in hand.

Another object of the invention is to provide an applicator gun which will mix the ingredients of the compound thoroughly and only upon demand from the operator.

A further object of my invention is to provide an applicator gun which, by means of refrigeration provisions within the gun, will permit it to be used intermittently without the danger of the small amount of mixed material present in the mixing chamber hardening between applications.

Still another object of the invention is to provide an applicator gun in which the components in contact with the mixed material will not adhere to the mixed material should the latter harden in the event of failure of the refrigeration system. Further to this object, my design also includes provisions for rapid dismantling of the affected portions of the applicator gun and ease of separation from any resulting plug of hardened filler material.

Another object of my invention is to provide an applicator gun in which the rate of flow is adjustable.

I achieve these and other objects by providing a mixing chamber within an outer case, the annular space therebetween forming a sealed chamber having an inlet and outlet to permit refrigerant to circulate therein. The filler material and hardening agent are supplied under pressure separately and in their correct proportions to the mixing chamber in which an agitator operates to ensure their correct and efficient mixing prior to their ejection through the applicator nozzle. A trigger mechanism operates supply valves for the filler material, the hardening agent and for supplying and regulating compressed air to the agitator motor.

With the above and other objects in view the invention consists in the novel features of construction, arrangements and combinations of parts set out herein as illustrated and more particularly pointed out in the claims which follow.

In describing the invention reference will be made to the accompanying drawings in which:

FIGURE 1 is a perspective view of an applicator gun embodying the features of the present invention.

FIGURE 2 is a sectional side elevation of the device of FIGURE 1, taken on the line 2—2.

FIGURE 3 is a fractional sectional elevation of the invention, taken on the line 3—3 of FIGURE 2, and FIGURE 4 is a fractional, sectional elevation of the applicator gun of FIGURE 1, taken on the line 4—4.

Referring to the drawings, an applicator gun 1 comprises a mixer assembly 2, a selector valve assembly 3 and a hand grip 4.

The mixer assembly 2 includes a tubular body 5 having an external screw thread 6 at the forward end and an internal screw thread 7 at the rear end thereof. A mixing chamber body 8 is of generally conical configuration, its narrowest end 9 being at the front and the front and rear ends being flanged at 10 and 11 respectively to engage the interior surface of the body 5 to enable the body 8 to be assembled inside said body 5. A pair of O-rings 12 and 13 or the like are fitted to the flanges 10 and 11 respectively in grooves 14 and 15 and serve to provide a fluid-tight seal at the extremities of an annular refrigeration cavity 16 formed between mixing chamber body 8 and the tubular body 5 and extending between the flanges 10 and 11.

Both ends of the mixing chamber body 8 are open, and the bore thereof which forms mixing chamber 17 is also tapered, its narrowest opening being at the front. A bearing plate 18 of disc-like conformation is axially perforated at 19 and a substantially hemispherical depression 20 is formed in the rear surface thereof coaxial with the perforation 19. The diameter of the depression 20 is substantially equal to the diameter of the front end of the mixing chamber 17 and upon assembly, as shown in FIGURE 2, is adapted to act as an extension to the mixing chamber 17. A discharge nozzle 21 screws onto the front threads 6 of body 5 and serves to retain bearing plate 18 in position at the end of mixing chamber body 8.

An agitator block 22 is of generally frusto-conical configuration and is adapted to be a running fit in the rear end of the chamber 17. An integral flanged base 23 to the block 22 is also a running fit in the bore of the body 5. Due to the relative softness of the material forming block 22, a metal drive disk 24 having a centre-boss 25 is in driving engagement with the base 23 through a plurality of drive pins 26.

A conventional air motor 27 is screwed into the threads 7 at the rear of body 5, its splined drive 28 fitting into mating splines 29 in the boss 25 of the drive disk 24. A plain bearing washer 30 is interposed between the front surface of the base 23 of the block 22 and the flat surface of the mixing chamber body 8 and is suitably perforated to receive the forward ends of the drive pins 26. A plurality of springs 31, herein shown as three in number circularly arranged and partially recessed into the front surface of the base 23, exert a forward pressure on the washer 30 to maintain its front surface in full sliding contact with the rear surface of the mixing chamber body 8.

A hemispherical depression 32 is formed in the front surface 33 of the agitator block 22 and is offset as close to the edge of the block 22 as possible.

A cone shaped agitator bar 34 extends between the bearing plate 18, protruding through the front of the mixing chamber body 8, and the agitator block 22. The bar 34 is rounded at each end to fit into the depressions 20 and 32 in the bearing plate 18 and the block 22 respectively in ball-and socket type engagement. It will be noted that as the block 22 rotates, the rearmost end 35 of the bar 34 moves in a circular path, while the foremost end 36 is maintained substantially centrally at the front of the mixing chamber 17. The foremost end 36 is slotted at 37 to provide an egress from the mixing chamber 17.

The rearmost portion 38 of body 5 is of increased thickness and the base portion 39 thereof is flat sided to form a mounting platform for the selector valve assembly 3. Five orifices 40, 41, 42, 43 and 44 are formed through the base 39. The foremost orifice 40 connects directly with the interior of the mixing chamber 17 through a hollow boss 45 formed on the wall of the mixing chamber body 8. The orifice 41 similarly communicates with the interior of the mixing chamber 17 and is adjacent to orifice 40. A groove 46 in the base 39 extends outwardly and thence rearwardly from the orifice 41 to provide the necessary interconnection with its supply duct in the selector valve assembly 3, to be hereinafter described. The third and fourth orifices 42 and 43 respectively communicate directly with the refrigeration cavity 16, orifice 43 also being extended rearwardly by means of a groove 47. The rearmost orifice 44 passes through the base 39 into the pressure inlet side of the air motor 27.

The selector valve assembly 3 comprises a block 48 through which five passages 49, 50, 51, 52 and 53 pass vertically. Of these passages, the second and fourth, 50 and 52 respectively, as shown in dotted detail in FIGURE 2, pass unrestrictedly through the block 48 and are located to one side of the three remaining passages 49, 51 and 53 which are substantially identical, coplanar and in full fore and aft alignment. In the following description, only the passage 49 and its associated valving will be described, but it should be understood that the passages 51 and 53 are similarly constructed and the operation of their associated valving is the same as that described.

From FIGURE 4 it will be seen that the passage 49 is in two parts, the lower part being designated 49a and the upper part 49b, in laterally offset relationship and interconnected by a transverse passage 49c. When at rest, the lower passage 49a is sealed off by a ball valve 54, the side walls of the transverse passage 49c forming a fluid-tight seating 55. A coil spring 56 is housed in a transverse passage 57, the latter extending outwardly in axial alignment with the transverse passage 49c to terminate in an internally threaded portion 58. A threaded plug 59 is screwed into the threaded portion 58 and serves to provide the required pressure on the spring 56 and also to blank off the transverse passage 57.

The head 60 of the plug 59 is provided with a milled edge 61 or the like and a screwdriver slot 62 to facilitate removal and replacement of plug 59 in the block 48.

A longitudinal passage 63 is formed through the block 48 and interconnects all the three transverse passages 49a, 49b and 49c. A selector plunger 64 extends through the passage 63 and is waisted in three positions. These waisted portions 65 are located each in juxtaposition to one of the three ball valves 54 when at rest, and are of a sufficiently reduced diameter to permit the ball valves 54 to remain fully seated. Axial movement of the plunger 64 causes the landed portions 66 thereof to contact the ball valves 54 and move them off their seats and in a preferred embodiment of the invention the forward faces of the relevant lands 66 are bevelled to provide a smooth, progressive opening operation. A trigger 67 is hingedly attached to the foremost end 68 of the plunger 64, the upper portion 67a thereof pivoting on the forward face of the block 48 which acts as a fulcrum so that rearward pressure on the remainder of the trigger causes the plunger 64 to move forward in order to open the ball valves 54. The rear end 69 of the plunger 64 extends beyond the rear surface of the block 48 for a distance sufficient to support a coil spring 70, one end of which contacts the block 48 and the other end contacts the flanged portion of a knurled collar 71 which in turn is held in place by a transverse pin 72 extending through one or other of a series of holes 69 through the plunger 64 so that the pressure exerted by the spring 70 may be adjusted or, alternatively, the collar 71 may be replaced by a nut of similar appearance, threaded on to the plunger 64 to provide a similar adjustment.

The selector valve assembly 3 is attached to the mixer assembly 2 by conventional means such as, for example, screws; and the block 48 is in fluid-tight engagement with the base 39 of the body member 5, a suitably apertured gasket 73 being inserted therebetween. Upon assembly, the passage 49 coincides with orifice 40, the passage 50 coincides with orifice 42, and the passage 51 coincides with the groove 46 and therefore links up with the orifice 41, the passage 52 coincides with orifice 43, and the passage 53 coincides with the orifice 44.

The hand grip 4 is preferably formed from a solid block of material, the front face 74 and rear face 75 being suitably contoured to provide a comfortable hand grip and the upper surface 76 being flat and square to mate with the undersurface of the block 48 to which the hand grip 4 is attached. Five drillings 79, 80, 81, 82 and 83 extend longitudinally through the hand grip 4, their positioning forming apertures in the upper surface 76 to correspond with the passages 49, 50, 51, 52, and 53 respectively. A gasket 77, suitably apertured, is inserted between the hand grip 4 and the selector valve assembly 3 to provide a fluid-tight joint upon the handgrip 4 being bolted or otherwise secured to the selector valve assembly 3.

The drillings 79 through 83 are adapted to receive the fixed portions of five quick release couplings 84, 85, 86, 87 and 88 respectively at the base 78 of the hand grip 4, the releasable portions of the couplings forming the ends of five flexible supply pipes 89, 90, 91, 92 and 93 respectively.

In describing the operation of this invention it will be assumed that the applicator gun 1 and its associated equipment is being used to apply an epoxy or polyester body filler with a hardening agent which must be mixed prior to application, but I do not intend that use of my invention should be limited to this particular application. The supply pipe 89 is accordingly connected to a suitably pressurized supply of epoxy polyester resin, and supply pipe 91 to a pressurized supply of hardening agent. A metering device, which is not claimed or shown at this time, is interconnected in pipes 89 and 91 to insure the resin and the hardening agent are supplied in the correct proportions, simultaneously, each time that the trigger 67 is depressed. The supply pipes 90 and 92 are connected to a refrigeration device with a circulating pump, so that refrigerant flows substantially unrestrictedly through one of these pipes (say 90) into and through the drilling 80 in the hand grip 4, passage 50 in the block 48 and the orifice 42 and thence into the refrigeration cavity 16 in the mixer assembly 2. After circulating in the cavity 16, it returns to the refrigerator though the orifice 43, passage 52 and drilling 82. The supply pipe 93 is connected to a compressed air supply.

Thus, upon depressing the trigger 67, the resin and hardening agent are both injected under pressure into the mixing chamber 17. At the same time, compressed air is supplied to the motor 27 which rotates and, through the splined drive 28, also causes the agitator block 22 to rotate. The agitator bar 34 is caused to move in a conical path as previously described, and this effectively stirs and mixes the resin and hardener. The pressure of the two liquids, plus the stirring action, forces the mixture forwards, to be ejected through the slots 37 in the foremost end 36 of the agitator bar 34. From there it passes through the perforation 19 in the bearing plate 18 and it is finally ejected through the nozzle 21.

The importance of my invention lies in the fact that, by keeping the mixing chamber body refrigerated, the chemical reaction between the resin and the hardener is inhibited, thereby allowing a thorough mixing of the two components without any premature, localized reaction taking place until the mixture is ejected through the nozzle and applied to the work piece.

An added advantage of an applicator gun of the present invention is that, upon releasing the trigger, all the mixing and ejection ceases, but the refrigeration cycle continues, so that the resin and hardener remaining in the mixing chamber do not react with each other as they would in any other non-refrigerated device, so that the gun is always ready for use regardless of the length of time elapsing between operations.

In a preferred embodiment of the invention, I provide a plurality of equi-spaced helical grooves 95 in the outer surface of the agitator block 22, curved in such a manner that should any of the mixture be forced rearwardly between the block 22 and the walls of the mixing chamber body 8, it will be thrown back into the mixing chamber 17 with the rotary action of the block 22.

I also intend to fabricate the mixing chamber body 8, the agitator bar 34, the bearing plate 18 and the agitator block 22 from a fluorocarbon resin material which has the property of non-adherence to epoxy or other body filler, even when the latter becomes cured. This material, in combination with the conical design of all these components, except the bearing plate, insures that the mixer assembly of the applicator gun can be quickly and easily taken apart and cleaned should the refrigeration unit fail and the mixture in the chamber become cured and hardened.

While I have shown and described herein the presently preferred construction and arrangement of parts for carrying out my invention, variation and modification thereof is possible without departing from the spirit of the invention. I, therefore, do not wish to be limited to the precise details of construction and arrangement set out herein but desire to avail myself of such variations as come within the scope of the appended claims.

What I claim is:

1. A mixer and applicator for viscose materials including a mixer assembly; said mixer assembly comprising a tubular outer body having an open front end and an open rear end; an open ended mixing chamber body having a tapered bore forming a mixing chamber; said mixing chamber body being assembled substantially coaxially within said outer body and peripherally sealed flange means extending therebetween to form an annular refrigeration chamber, the narrowest open end of said mixing chamber being substantially concentric with the said open front end of said outer body; a substantially cone shaped agitator bar, having a transversely slotted, rounded front end and a plain rounded rear end, housed within said mixing chamber; an axially perforated bearing plate extending across the front end of said mixing chamber body; a detachably attached nozzle extending across the said front end of said outer body; a frustoconical agitator drive block inserted in the widest open end of said mixing chamber and being rotatable therein, a running clearance being maintained between said agitator drive block and the walls defining said mixing chamber; said agitator bar extending between the rear face of said bearing plate and the front face of said agitator drive block; said rear face of said bearing plate having a first depression formed therein substantially centrally and said front face of said agitator drive block having a second depression formed therein offset from centre; said first and second depressions closely receiving said front and rear ends of said agitator bar in driving engagement; selectable driving means to rotate said agitator drive block; said mixing chamber body having a plurality of inlet means adjacent to and forward of said front face of said agitator block; said outer body having inlet and outlet means in communication with said refrigeration chamber; selective valve means supplying said viscous materials to said mixing chamber through said inlet means; and means supplying and circulating fluid refrigerant to said refrigeration chamber through said inlet and outlet means in said outer body.

2. A mixer and applicator as defined in claim 1 in which said mixing chamber body, said agitator bar and said agitator drive block are formed of a fluorocarbon resin material.

3. A mixer and applicator as defined in claim 1, said agitator drive block having a plurality of spiral grooves formed in the wall thereof, said grooves curving away from the direction of rotation of said drive block.

4. A mixer and applicator as defined in claim 1, said driving means for said agitator drive block including an air-driven motor and a drive shaft from said motor in driving engagement with said agitator drive block, said air motor being mounted on said rear end of said outer body; and means supplying pressure air to said air motor.

5. A mixer and applicator as defined in claim 1, said driving means being an air motor; a selector valve assembly attached to said outer body, having a plurality of first passages therethrough to coincide with said plurality of inlet means to said mixing chamber, a pair of second passages to coincide with said inlet and outlet means to said refrigeration chamber, and a third passage for providing pressure air to said air motor; valve means interrupting fluid flow through said first and third passages and trigger operated means to selectably override said valve means.

6. A mixer and applicator as defined in claim 5 in which said valve means includes spring loaded ball valves; a plunger juxtaposed all of said ball valves; said plunger being waisted to provide a plurality of lands and waisted portions, one of said waisted portions being located adjacent each of said ball valves in a first position of said plunger to allow said ball valves to remain seated; one of said lands being in contact with each of said ball valves in a second position of said plunger to move said ball valves off their seats; trigger means attached to said plunger; said plunger being resiliently biassed into said first position; and pressure on said trigger moving said plunger to said second position.

7. A mixer and applicator as defined in claim 5 including a hand grip attached to said selector valve assembly; said handgrip having a plurality of first drillings, a pair of second drillings and a third drilling formed therethrough; the upper end of said hand grip being in sealed engagement with said selector valve assembly, and the upper orifices of said first drillings coinciding with said first passages, the upper orifices of said second drillings coinciding with said second passages, the upper orifice of said third drilling coinciding with said third passage; and a plurality of pipe lines communicating with said orifices, a first plurality of said pipe lines coinciding with said first drillings and supplying said viscous materials, a second pair of said pipelines coinciding with said second drillings and providing the supply and return for said refrigerant, and a third pipeline supplying pressure air to said third drilling.

References Cited

UNITED STATES PATENTS 3,171,721  3/1965  Strathearn et al. _____ 259—5 X
3,201,094  8/1965  Ligon et al. _____ 259—5

WILLIAM I. PRICE, *Primary Examiner.*

WALTER A. SCHEEL, *Examiner.*

J. M. BELL, *Assistant Examiner.*